US007069789B2

(12) United States Patent
Tokunaga et al.

(10) Patent No.: US 7,069,789 B2
(45) Date of Patent: Jul. 4, 2006

(54) INERTIAL SENSOR

(75) Inventors: Hiroshi Tokunaga, Kanagawa (JP); Kenji Nagata, Kanagawa (JP); Masaaki Ono, Kanagawa (JP); Toshio Hanazawa, Kanagawa (JP); Hiroshi Ishikawa, Kawasaki (JP)

(73) Assignees: Fujitsu Media Devices Limited, Yokohama (JP); Fujitsu Limited, Kawasaki (JP)

( * ) Notice: Subject to any disclaimer, the term of this patent is extended or adjusted under 35 U.S.C. 154(b) by 0 days.

(21) Appl. No.: 11/094,158

(22) Filed: Mar. 31, 2005

(65) Prior Publication Data

US 2006/0005629 A1   Jan. 12, 2006

(30) Foreign Application Priority Data

Jul. 12, 2004  (JP)  ............................. 2004-205179

(51) Int. Cl.
    *G01B 7/16*  (2006.01)
(52) U.S. Cl. ........................................................ 73/777
(58) Field of Classification Search ................... 73/777
    See application file for complete search history.

(56) References Cited

U.S. PATENT DOCUMENTS

| 5,415,726 A | * | 5/1995 | Staller et al. ................... 216/2 |
| 6,557,414 B1 | * | 5/2003 | Sakurai et al. ........... 73/504.04 |
| 6,789,423 B1 | * | 9/2004 | An et al. .................. 73/504.04 |

FOREIGN PATENT DOCUMENTS

JP   2000-187041   7/2000

* cited by examiner

*Primary Examiner*—Max Noori
(74) *Attorney, Agent, or Firm*—Arent Fox PLLC

(57) ABSTRACT

An inertial sensor such as an acceleration sensor or gyro can have superior impact resistance by regulating displacement of a weight portion in the direction of an upper limit. The sensor includes a sensor portion that has a fixing part, a weight portion the height of which is a predetermined size shorter than that of the fixing part, and a beam portion that links the weight portion and the fixing part; a plate-like first stopper portion that covers the weight portion and is bonded to the fixing part with clearance of a predetermined size from the weight portion; and a flat, plate-like second stopper portion that is connected to the fixing part via a bump of a predetermined height on the side opposite the first stopper portion.

6 Claims, 7 Drawing Sheets

INERTIAL SENSOR

BACKGROUND OF THE INVENTION

1. Field of the Invention

The present invention relates to an inertial sensor and, more particularly, to an inertial sensor such as an acceleration sensor or gyro that possesses superior impact resistance.

2. Description of the Related Art

The inertial sensors such as acceleration sensors or gyros of recent years allow miniaturization, high performance and lower costs to be implemented simultaneously due to the development of microprocessing technology that applies MEMS (Micro Electro Mechanical System) technology. In this context, the installation of MEMS device inertial sensors in all kinds of devices requiring motion sensing is to be expected, such as devices directed toward car navigation, in-vehicle air bag control, the avoidance of image blurring due to hand movement for cameras, video cameras, and so forth, cellular phones, robot posture control, game gesture input recognition, HDD rotation and shock sensing, and so forth.

Further, such devices, for which motion sensing is required, can, on occasions, be subject to large unexpected shocks, and there is therefore the danger that large shocks will be applied to inertial sensors that are mounted in such devices. For example, in an automobile application such as an in-vehicle air bag, large shocks, which cannot occur during normal operation, can be applied to an inertial sensor in the event of a rear-end collision or vehicle roll and, in the case of a cellular phone or similar, shocks are to be expected when the cellular phone is dropped by mistake. Further, in the case of a hobby application such as a gaming device, extremely large shocks can occur when the gaming device is handled roughly by the user. Such accidental shocks, which are applied unexpectedly, may be said to be 3000 G and 5000 G, and therefore inertial sensors that are mounted in such devices require high impact resistance.

However, the inertial sensor has a basic constitution in which a movable weight portion is suspended by a beam. Therefore, known problems include the fact that when a large shock is accidentally applied, the beam is greatly deformed and damaged and the sensor function is lost. An invention for resolving this problem is disclosed by Japanese Patent Application Laid Open No. 2000-187041.

The capacitive-type acceleration sensor disclosed by Japanese Patent Application Laid Open No. 2000-187041 is such that buffer material is provided on an insulating protective cover that is housed with the moving part interposed therebetween as a device for preventing damage to the moving part due to shocks even in the event that the moving part and insulating protective cover should collide upon receiving a large shock. Further, the provision of this buffer material makes it possible to obtain an acceleration sensor with which there is no risk of measurement of the acceleration no longer being possible due to damage to the moving part as a result of dropping the device in which the sensor is mounted.

However, the acceleration sensor disclosed by Japanese Patent Application Laid Open No. 2000-187041 is an invention that was conceived in order to resolve the problem of carrying an acceleration sensor with a constitution in which 'a mass 4a is movably supported in parallel with a face joining glass substrates 6 and 7 and a silicon substrate 1 via a beam 4c (See Japanese Patent Application Laid Open No. 2000-187041, paragraph No. 0005). The acceleration sensor also has a constitution 'that implements a structure in which the width of the beam supporting the mass 4Aa is narrow in comparison with the thickness and it is difficult to displace the mass 4Aa toward the glass substrates 6A and 7A' (See Japanese Patent Application Laid Open No. 2000-187041, paragraph No. 0026), the space within which the moving part can move being limited to a mostly two-dimensional space that is parallel to the face joining the glass substrates 6, 7 and the silicon substrate 1.

Further, an acceleration sensor is obtained with which there is no risk of measurement of the acceleration no longer being possible due to damage to the moving part as a result of dropping the device in which the acceleration sensor is mounted because a recess 6Aa that is approximately 15 μm deep is formed on the glass substrate 6A in the face opposite a protrusion 4Ab of the mass 4Aa and an aluminum layer 8 that is approximately 5 μm thick is deposited by means of vapor deposition as a buffer material for buffering shocks caused by collisions with the protrusion 4Ab on the bottom face of the recess 6Aa (See Japanese Patent Application Laid Open No. 2000-187041, paragraph No. 0027).

That is, the buffer material with which the acceleration sensor disclosed by Japanese Patent Application Laid Open No. 2000-187041 is provided is provided on the surface of a glass substrate on which the moving part is not displaced during normal operation of the acceleration sensor. Hence, there is the problem that, because the moving part moves in three dimensions during normal operation, this buffer material cannot be applied to an inertial sensor with a constitution that affords the original functions.

Therefore, the present inventors first proposed a constitution that allows the impact resistance to be improved also for an inertial sensor such as an acceleration sensor or gyro that comprises a moving part capable of three-dimensional movement (Japanese Patent Application No. 2004-099161).

The constitution proposed in the above application was such that, in an inertial sensor that comprises a sensing portion in which a weight portion, which is a moving part, is supported by a beam, a weight stopper portion is disposed close to the weight portion with a predetermined clearance from the weight portion by MEMS-processing part of the substrate of the sensing portion.

However, because this constitution is a structure in which a stopper portion for displacement of the weight portion in one direction is formed by MEMS-processing part of the substrate of the sensing portion, MEMS processing is complicated and it is necessary to either thicken the sensing portion substrate or narrow the weight portion, which is not advantageous from the perspective of reducing the height of the element or from the perspective of the detection sensitivity.

SUMMARY OF THE INVENTION

Therefore, the present invention was conceived in view of this problem, an object thereof being to provide an inertial sensor with a constitution that is capable of increasing the impact resistance even of an inertial sensor such as an acceleration sensor or gyro that comprises a moving part capable of three-dimensional movement and that is capable of simultaneously implementing miniaturization and a height reduction.

A first aspect of the inertial sensor according to the present invention that serves to achieve the above object is an inertial sensor that comprises a sensor portion that has a fixing part, a weight portion the height of which is a predetermined size shorter than that of the fixing part, and a beam portion that links the weight portion and the fixing part; a plate-like first stopper portion that covers the weight portion and is bonded to the fixing part with clearance of a predetermined size from the weight portion; and a flat plate-like second stopper portion that is connected to the fixing part via a bump of a predetermined height on the side opposite the first stopper portion.

A second aspect of the inertial sensor according to the present invention that serves to achieve the above object is the inertia sensor according to the first aspect, wherein the height of the predetermined size and the predetermined height of the bump are established at or exceeding the range of displacement of the weight portion corresponding to the dynamic range.

A third aspect of the inertial sensor according to the present invention that serves to achieve the above object is the inertia sensor according to the first or second aspect, wherein the fixing part of the sensor portion is a frame portion, the weight portion is disposed within the frame portion, and the frame portion, the weight portion, and the beam portion linking the weight portion and the frame portion are integrally formed.

A fourth aspect of the inertial sensor according to the present invention that serves to achieve the above object is the inertia sensor according to the first or second aspect, wherein the fixing part of the sensor portion is a center shaft, the weight portion is disposed at the circumference of the center shaft, and the center shaft, the weight portion, and the beam portion linking the weight portion and center shaft are integrally formed.

A fifth aspect of the inertial sensor according to the present invention that serves to achieve the above object is the inertia sensor according to the third or fourth aspect, wherein the integrally formed fixing part, weight portion, and beam portion of the sensor portion are formed from a silicon substrate by means of MEMS processing.

A sixth aspect of the inertial sensor according to the present invention that serves to achieve the above object is the inertia sensor according to the first aspect, wherein the sensor portion comprises a piezoresistive element in the parts of the beam portion in which the beam portion is connected to the fixing part and the weight portion, and the inertia in multiaxial directions is detected from the change in the resistance resulting from displacement of the weight portion.

In addition, a seventh aspect of the inertial sensor according to the present invention that serves to achieve the above object is the inertia sensor according to the first aspect, wherein the sensor portion is such that a first electrode is formed on the end face of the weight portion and a second electrode is formed opposite the first electrode on at least the first stopper portion or the second stopper portion; and the inertia in multiaxial directions is detected by the change in the capacitance between the first and second electrodes caused by displacement of the weight portion.

The present invention provides a stopper portion on both sides of the weight portion, and therefore, even in cases where the weight portion moves upward and downward to exceed the displacement amount corresponding to the rated sensitivity range of the sensor, movement is prevented by the weight stopper portion. Problems such as the loss of the sensor function due to damage arising from major deformation of the beam can thus be avoided even in cases where a large shock is accidentally applied.

DESCRIPTION OF THE PREFERRED EMBODIMENTS

The preferred embodiments of the present invention will be described hereinbelow with reference to the drawings. Further, the embodiments described permit an understanding of the present invention but the technological scope of the present invention is not limited to or by these embodiments.

As an embodiment example of the inertial sensor according to the present invention, the sensing portion is built into a silicon substrate by means of MEMS technology and the sensing portion is placed on a holding member such as a glass substrate and sealed in a package to render an element.

Figure 1A:
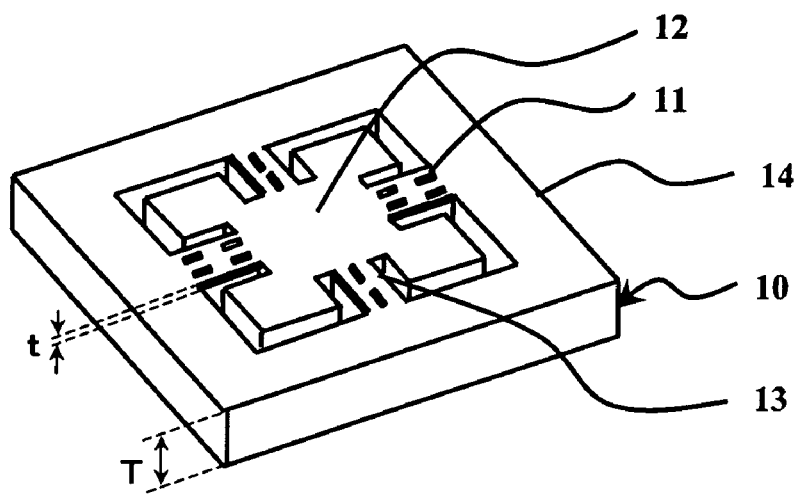
FIG. 1A through 1C is a conceptual view to illustrate the structure of a sensing portion, which is the main portion of the inertial sensor.
Figure 1B:
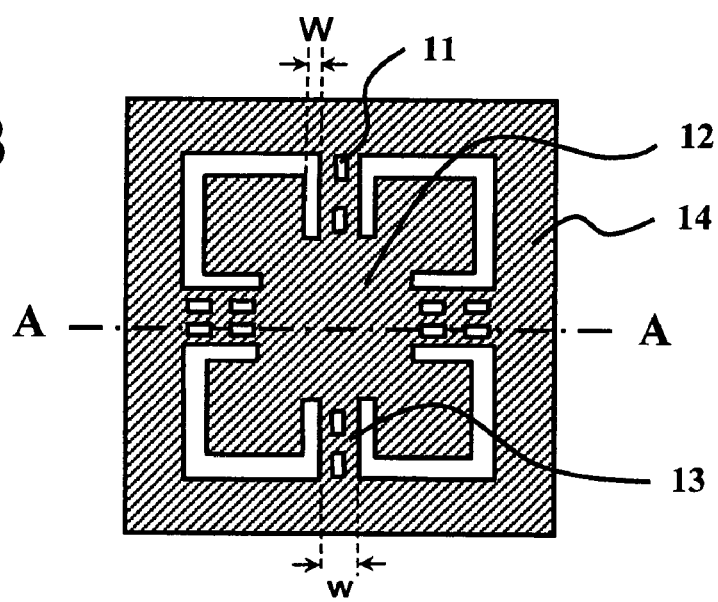
Figure 1C:
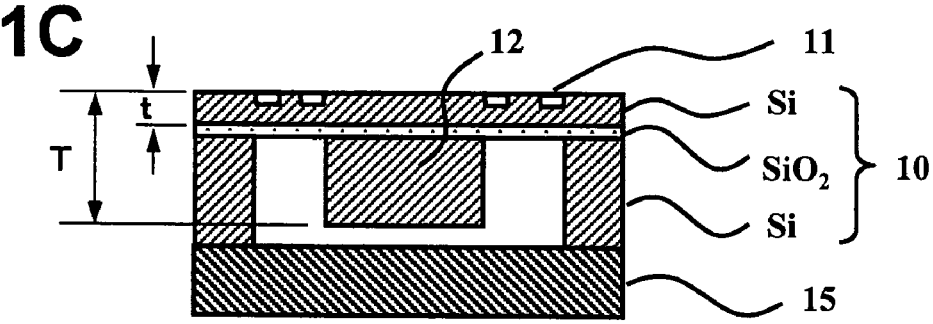

FIG. 1 is a conceptual view to illustrate the structure of the sensing portion, which constitutes the main part of the inertial sensor. FIG. 1A is a perspective view of the sensing portion; FIG. 1B is a planar view of the sensing portion; and FIG. 1C is a cross-sectional view along A—A in a state in which the sensing portion is mounted on the glass substrate.

In FIGS. 1A and 1B, the SOI substrate 10, which is a substrate for fabricating the sensing portion of the inertial sensor, is constituted comprising a frame portion 14, a piezoresistor 11 that is built into the SOI substrate 10 by means of a process that will be described subsequently, a weight portion 12, which is the moving part of the sensing portion, and a beam 13 that links the weight portion 12 and frame portion 14 and supports the movement of the weight portion 12. In addition, as shown in FIG. 1C, a glass substrate 15 is fixed to the frame portion 14 to support the beam 13 and hold the weight portion 12 in order to face one end face of the weight portion 12 in the axial direction thereof.

With this constitution, when the weight portion 12, which is a moving part, moves, the movement translates to runout and flexure of the beam 13 and the resistance value of the piezoresistor 11 that is provided on the beam 13 changes, and the change in the resistance value is detected as an electrical signal output by using a Wheatstone bridge circuit.

Further, W in FIG. 1 is the gap between the weight portion 12 and beam 13, while w is the beam width, T is the thickness of the weight portion and t is the beam thickness.

Here, in order to increase the impact resistance of the inertial sensor with a constitution in which the weight portion 12 is supported by the beam 13, a procedure that involves increasing the strength of the beam 13 or alleviating the mechanical load acting on the beam 13 by reducing the weight of the weight portion 12 that is supported by the beam 13 may be considered.

However, the impact resistance and sensor sensitivity are generally inversely proportional to each other and, therefore, increasing the impact resistance by means of such a procedure results in a drop in the sensor sensitivity. For example, raising the mechanical strength of the beam 13 by increasing the thickness t of the beam 13, widening the width w, and shortening the length means that the movement of the weight portion 12 during normal operation inevitably slows and the sensor sensitivity drops such that there is a decrease in the amount of change in the resistance value of the piezoresistor 11 provided on the beam 13.

Further, as per a case where the weight of the weight portion 12 is reduced, effects such as a drop in the sensitivity of the sensor are produced.

In order to implement an inertial sensor that avoids such problems and has superior impact resistance, the inertial sensor of the present invention is provided with first and second weight stopper portions for limiting the range of vertical movement of the weight portion 12 to a predetermined range. Therefore, in cases where the weight portion 12 moves to exceed the displacement amount corresponding with the rated sensitivity range of the sensor, the movement is prevented by the weight stopper portion. Therefore, the problem of the loss of the sensor function due to damage arising from major deformation of the beam can thus be avoided even in cases where a large shock is accidentally applied.

FIGS. 2 and 3 serve to illustrate an example of the fabrication process of the sensor portion shown in FIG. 1 constituting an embodiment that is applied to the inertial sensor of the present invention.

Figure 2A:
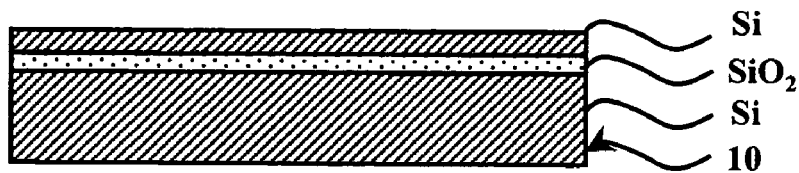
FIG. 2A through 2F illustrate an example of the fabrication process of the sensing portion shown in FIG. 1 constituting an embodiment that is applied to the inertial sensor of the present invention.

The substrate 10 employed here is a Si/SiO$_2$/Si (=10 to 20 µm/1 µm/500 µm) layer substrate with a four-inch diameter (FIG. 2A). The main surface of the substrate 10 (an Si surface that is 10 to 20 µm thick) is oxidized to form an oxide film 21, windows for ion injection are opened in predetermined parts of the oxide film 21, and B diffusion regions are provided by means of ion injection with boron B by using the oxide film 21 and a resist (not shown) that is coated on the oxide film 21 as a mask, whereby the piezoresistors 11 are formed.

Figure 2B:
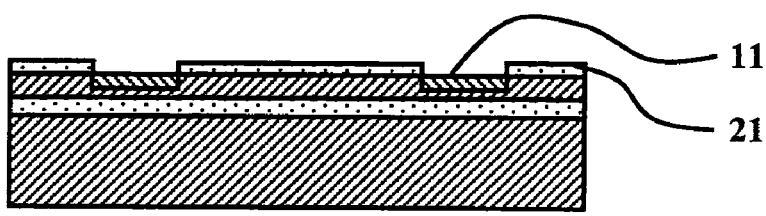

Thermal processing at 800 to 1300° C. (→1000° C.) is performed after the formation of the piezoresistors 11 and the oxide film 21 becomes a thick-film oxide film 22 as a result of performing thermal oxidation once again (FIG. 2B).

Figure 2C:
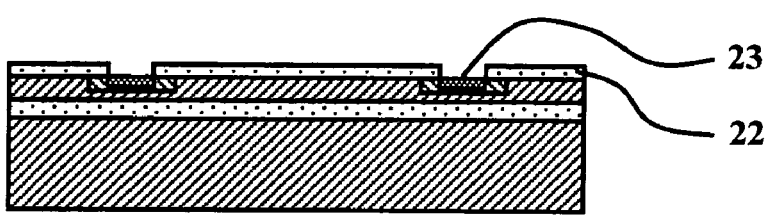
Figure 2D:
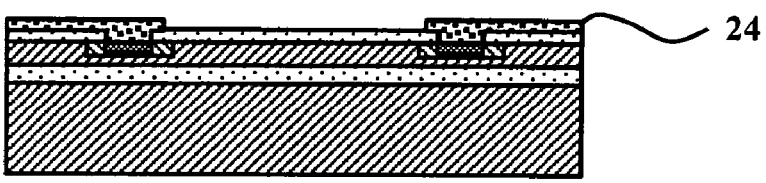

Next, windows are opened in the parts of the oxide film 22 that correspond with wiring contact portions for the piezoresistor 11 and B-ion injection 23 for contact reparation is then performed. Annealing at 800 to 1300° C. (→1000° C.) in a nitrogen atmosphere is then performed in order to improve the problem of piezoresistor leakage (FIG. 2C). Thereafter, an Al—Si alloy film is deposited over the whole surface by means of DC-magnetron sputtering, magnified-projection contact exposure with a minimum line width of 5 µm is performed, and patterning by means of reactive ion etching (RIE) using a chlorine-based gas is executed, whereby the wiring 24 is formed (FIG. 2D).

Figure 2E:
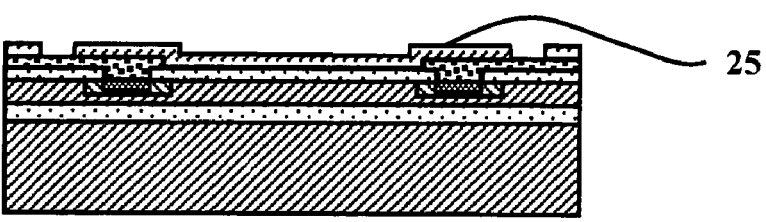
Figure 2F:
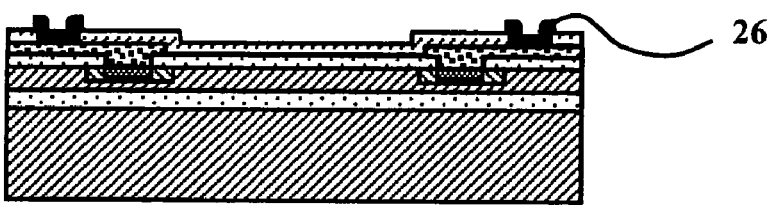

After an oxide film 25 has been deposited by means of TEOS source CVD in order to protect the Al in the wiring 24, wire-bonding pad windows are opened by means of RIE using CF$_4$ gas (FIG. 2E). In addition, patterns 26 for protecting the Al pads are formed by depositing an Au (300 nm)/Ti (150 nm) stacked film over the whole surface and then lifting off this film (FIG. 2F).

Figure 3A:
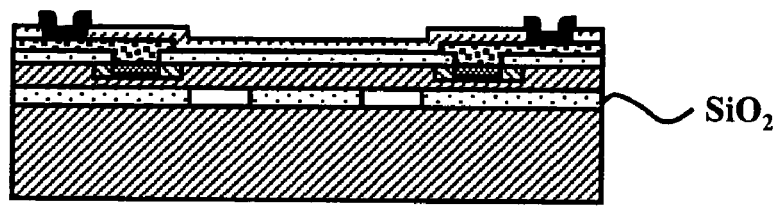
FIG. 3A through 3D illustrate an example of a fabrication process of the sensing portion that follows on from the steps in FIG. 2.

Thereafter, the processing moves to the processing of FIG. 3, whereupon the Si on the surface side is etched by means of RIE to the extent of the film thickness and SiO$_2$ at predetermined points is removed by etching in a box shape (FIG. 3A). In this figure, the part removed by etching (part removed in a box shape) that is shown in the B—B cross-sectional of FIG. 1B and the piezoresistor part are shown combined.

Figure 3B:
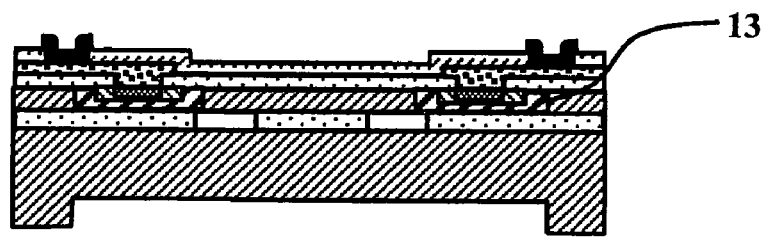

The beam 13 is formed by etching the oxide film 25, the Si layer (10 to 20 µm) of the main surface of the SOI substrate 10, and the SiO$_2$ layer (1 µm) (FIG. 3B).

Figure 3C:
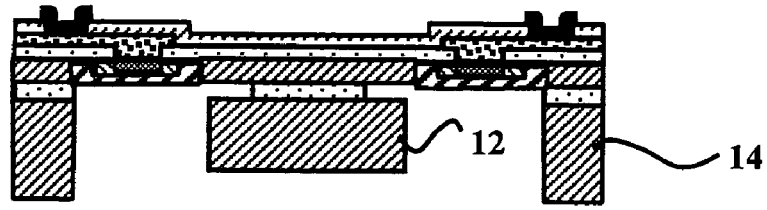

Following this beam formation, dual-sided alignment exposure is performed and Si etching at approximately 500 µm is executed by means of RIE to form a weight portion 12 with a verticality of 90 degrees ±1 degree (FIG. 3C; at this stage, a sensor portion that is integrated in the inertial sensor of the present invention shown in FIG. 1 is obtained).

Figure 3D:
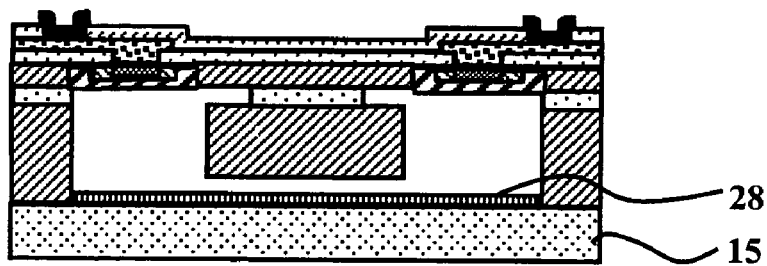

Subsequently, FIG. 3D shows the formation of the first weight stopper portion in accordance with the present invention. Prior to the formation of the first weight stopper portion, cleaning before anodic coupling is performed by means of a H$_2$SO$_4$—H$_2$O$_2$ mixture. A Cr layer 28 with a film thickness of 200 nm is then provided on a glass portion 15 that has the same thermal expansion coefficient as the Si substrate, and the frame portion 14 of the sensor portion undergoes anodic coupling to the glass portion 15.

Following this anodic coupling, sintering in a nitrogen atmosphere is performed. As a result of the above steps, a plurality of sensor portions that is rendered by the adhesion of a plate-like glass portion 15, which constitutes the first weight stopper portion, is obtained as a multiplicity of the SOI substrate 10, as shown in FIG. 3D. Subsequently, the sensor portions are broken off individually by means of dicing.

Here, in the case of the constitution shown in FIG. 3D, the glass portion 15 constituting the first weight stopper portion allows the downward displacement of the weight portion 12 to be regulated in the event of a shock. Further, the Cr layer 28 functions as buffer material for buffering the impact force when the weight portion 12 hits the first weight stopper portion.

However, in the constitution shown in FIG. 3D, the displacement of the weight portion 12 in the opposite direction to the first weight stopper portion cannot be regulated.

Therefore, the present invention is characterized by a constitution in which a second weight stopper portion for regulating the displacement of the weight portion 12 in the opposite direction to the first weight stopper portion is further provided.

Figure 4:
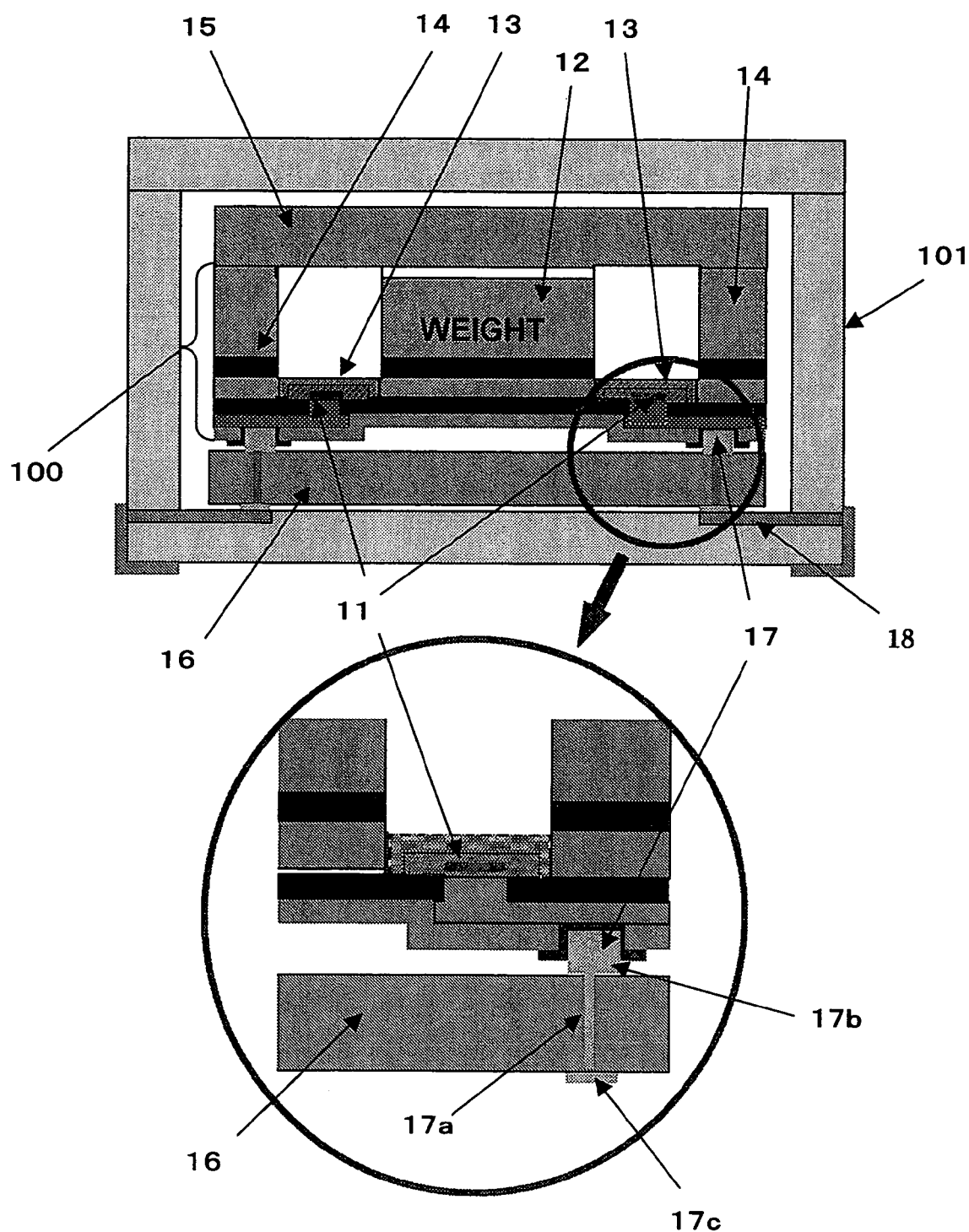
FIG. 4 illustrates a first embodiment of the inertial sensor of the present invention.

FIG. 4 illustrates the first embodiment of the inertial sensor of the present invention. A sensor chip, which is first fabricated by means of the fabrication process illustrated in FIGS. 2 and 3 and to which are fixed a sensor portion 100, which is broken up into individual pieces by means of dicing, and the plate-like glass portion 15, which is to become the first weight stopper portion, is disposed in a package 101 after being inverted.

Thereupon, in FIG. 4, a face that is opposite the plate-like glass portion 15 that is to constitute the first weight stopper portion is placed on the floor of the package 101 via a silicon substrate 16 that is to constitute the second weight stopper portion that lies opposite with predetermined clearance.

The silicon substrate 16 that is to constitute the second weight stopper portion and the sensor chip are flip-chip mounted and are as shown enlarged in the lower circled section of FIG. 4. That is, the size of the clearance of the silicon substrate 16 that is to constitute the second weight stopper portion from the sensor chip and is established by means of a metal bump 17 that is connected to Al wiring that is guided from the piezoresistor 11 formed on the beam 13.

The silicon substrate 16 electrically connects the electrode pads 17b and 17c that are formed on the upper and lower faces of the silicon substrate 16 by means of through wiring 17a. In addition, an externally linked extraction electrode 18 is formed on the floor of the package 101.

Therefore, the sensor chip is disposed on the silicon substrate 16 via the metal bump 17, and when the metal bump 17 is also bonded to the floor of the package 101, an electrical connection is formed from the piezoresistor 11 to the extraction electrode 18. Further, when the package is hermetically sealed, a complete inertial sensor is obtained.

As detailed above, the inertial sensor according to the present invention comprises first and second weight stopper portions for the weight portion 12 above and below the weight portion 12. Therefore, even in cases where the weight portion moves upward and downward to exceed the displacement amount corresponding with the rated sensitivity range of the sensor, movement can be prevented by the weight stopper portions. Therefore, problems such as that of losing the sensor function due to damage arising from major deformation of the beam can thus be avoided even in cases where a large shock is accidentally applied.

Here, the interval or clearance between the weight portion 12 and the first and second weight stopper portions will be examined. If the interval (clearance) between the weight stopper portion and the weight portion 12 is narrowed, the impact resistance is raised but the range of movement of the weight is reduced and hence the dynamic range of the sensor drops. On the other hand, if the clearance is widened, the range of movement of the weight is wider and the dynamic range of the sensor is then broader. However, when the clearance is widened too much, the result is that the weight stopper portion does not function effectively and the expected impact resistance cannot be obtained.

Therefore, the clearance between the sensor portion and weight stopper portion that the inertial sensor of the present invention comprises is determined so that both the dynamic range of the sensor and the desired impact resistance are satisfied.

Figure 5:
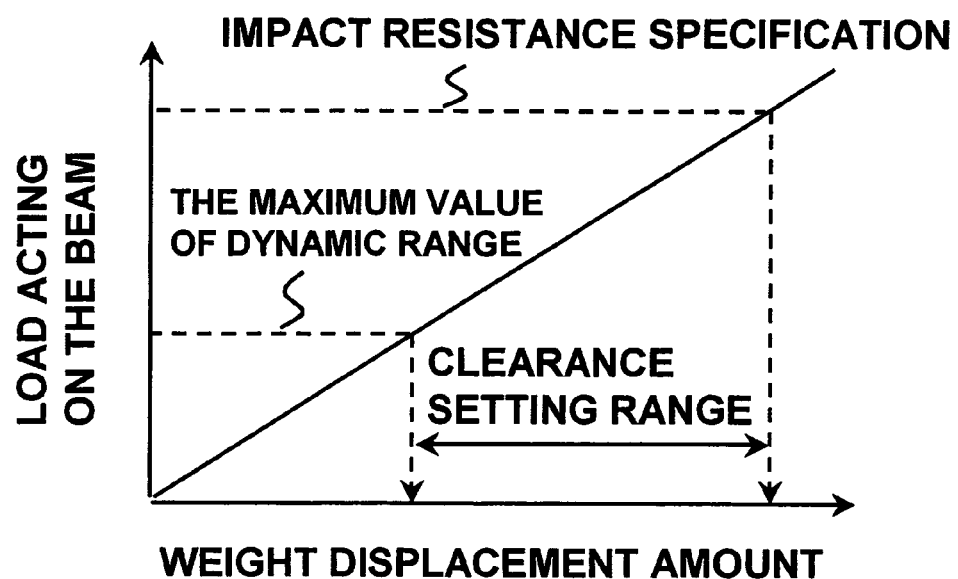
FIG. 5 serves to illustrate the concept of clearance setting and shows the relationship between the weight displacement amount (horizontal axis) and the load acting on the beam (vertical axis)

FIG. 5 serves to illustrate the concept of clearance setting and shows the relationship between the weight displacement amount (horizontal axis) and the load acting on the beam (vertical axis). If the maximum value of the dynamic range found for the sensor portion and the range of the weight displacement amount corresponding with the impact resistance specifications, which are illustrated in FIG. 5, are determined, the weight displacement amount range that satisfies the two criteria (that is, a range equal to or more than the maximum value of the dynamic range and at or below the impact resistance specification) is known as the clearance setting range.

Further, the clearance is preferably reduced as far as possible. This is because it may be considered that, when the clearance is widened more than is necessary, the weight portion 12, which has started to move due to an accidental shock, then accelerates greatly over the interval up until the movement of the weight portion 12 is limited by the stopper portion and is thus damaged upon striking the stopper portion.

Therefore, in FIG. 4, the interval between the weight portion 12 and the first stopper portion and the size of the interval between the weight portion 12 and the second stopper portion are determined from the relationship shown in FIG. 5. Further, the size of the interval between the weight portion 12 and the second stopper portion may be adjusted by changing the size of the bump 17.

Figure 6:
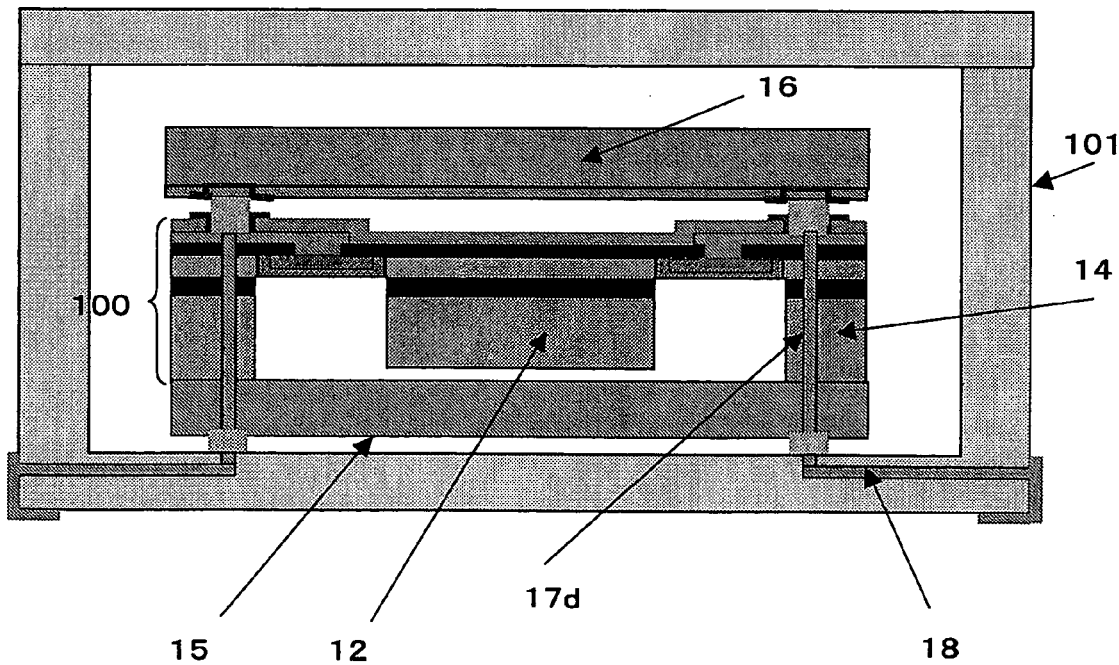
FIG. 6 is a second embodiment of the inertial sensor according to the present invention.

FIG. 6 is a second embodiment of the inertial sensor according to the present invention. The constitution shown in FIG. 6 is characterized in that, in comparison with the constitution of the embodiment shown in FIG. 4, the constitution rendered by combining the sensor portion 100 and the first and second stopper portions is inverted and housed within the package 101.

That is, the structure is such that the glass substrate 15, which is to constitute the first weight stopper portion, is disposed on the bottom side of the package 101. In addition, the silicon substrate 16, which is to constitute the second weight stopper portion, is an IC circuit substrate.

A circuit that processes a detection signal obtained from the piezoresistor 11 according to the application is mounted on the IC circuit substrate. Through-wiring 17d is formed in the frame portion 14 for a connection with the extraction electrode 18 outside the package 101.

In the second embodiment shown in FIG. 6, the silicon substrate 16, which is to constitute the second weight stopper portion, is rendered an IC circuit substrate. Therefore, in the embodiment of FIG. 4, the silicon substrate 16, which is placed at the bottom of the package 101 and is to constitute the second weight stopper portion, can also be rendered an IC circuit substrate.

Here, although in the embodiment of FIG. 4 or 6, the adjustment of the interval between the weight portion 12 and the second weight stopper portion was described as an adjustment using the height of the bump 17 in a case where the sensor portion 100 is flip-mounted with the substrate 16 that is to constitute the second weight stopper portion, the height of the package gap can also be adjusted by means of an alloy sealing material.

Figure 7:
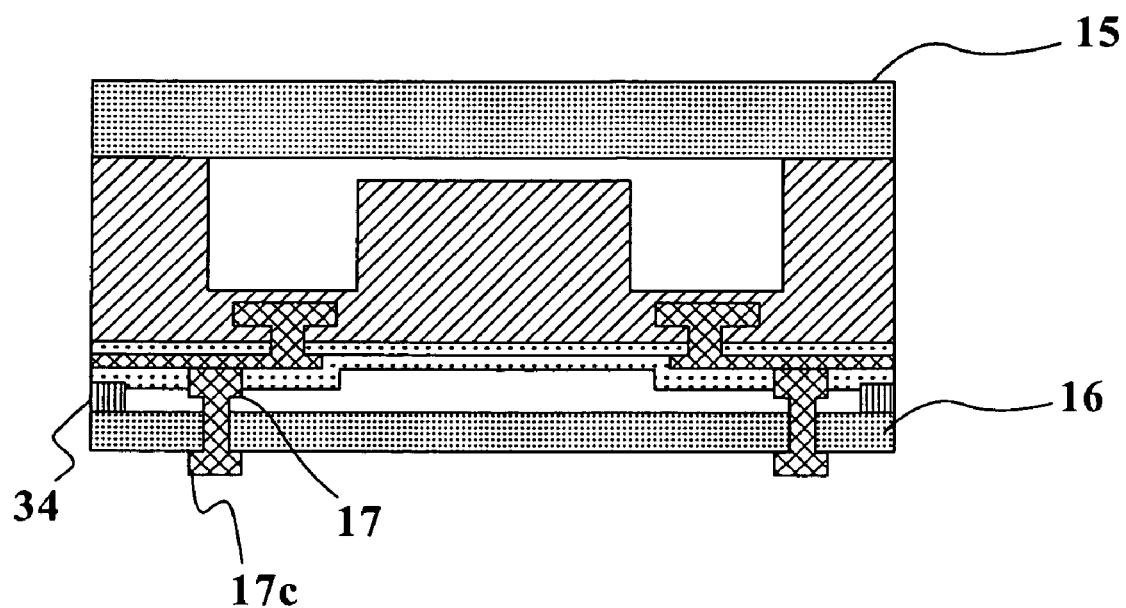
FIG. 7 illustrates a method for forming a gap beforehand.
Figure 8:
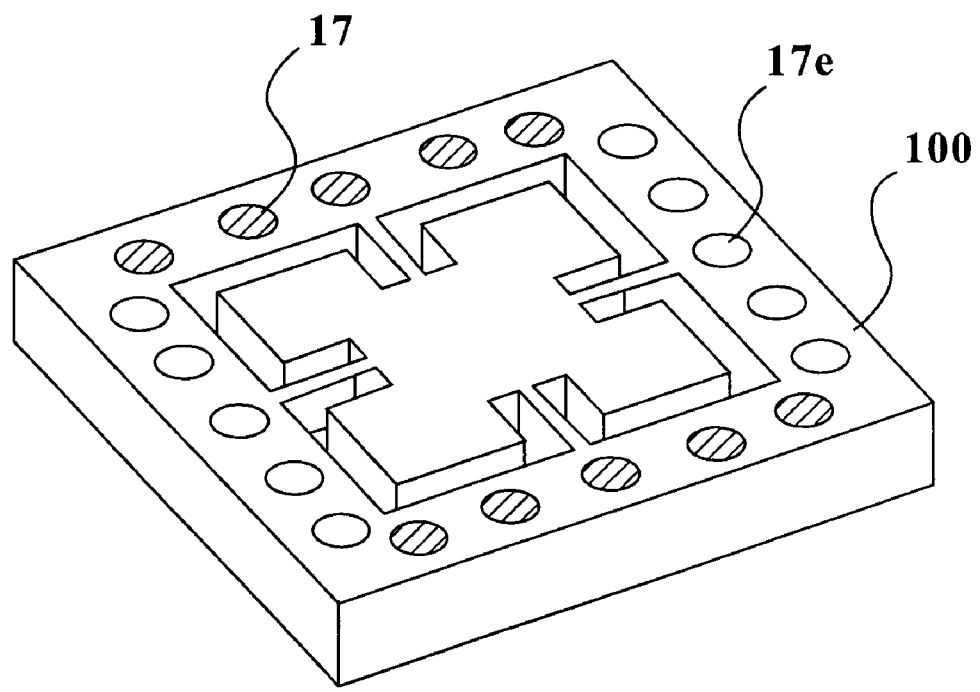
FIG. 8 serves to illustrate an aspect in which dummy bumps are provided at the circumference of the sensing portion.

In this case, because it is difficult to form the gap uniformly, a method according to which a spacer 34 for forming the gap is provided at the end of the stopper portion 16 beforehand, as shown in FIG. 7, for example, is effective. Further, in order to make the gap uniform, in a case where a gap is provided only by means of a bump, a method that provides contact bumps 17 and dummy bumps 17e, which serve to achieve a substantially uniform arrangement, and so forth, not only in the parts for which an electrical connection is desired but also on the frame 14 of the sensor portion 100, as shown in FIG. 8, is effective. In addition, the provision of dummy bumps means that an effect allowing the joining strength to be increased can be expected.

Figure 9:
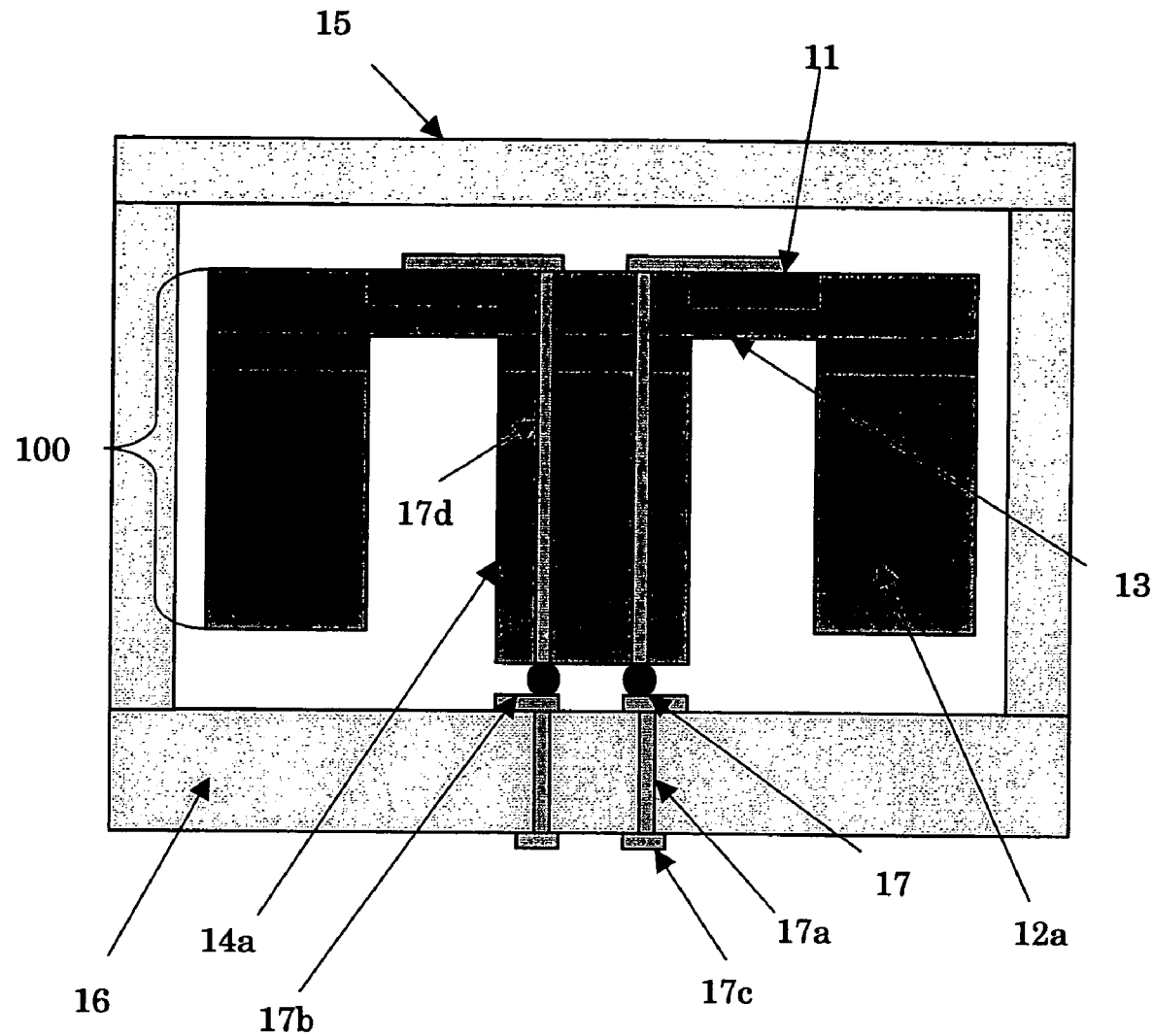
FIG. 9 serves to illustrate the constitution of another embodiment that applies the concept of the present invention.

FIG. 9 illustrates the constitution of another embodiment that further applies the concept of the present invention. The embodiment above represents a constitution in which the weight portion 12 is arranged within frame portion 14 as the sensor portion 100 and a beam that links the weight portion 12 and frame portion 14 is integrally formed. However, the application of the present invention is not limited to or by such a constitution.

That is, the example shown in FIG. 9 is a surround-mass type sensor structure that comprises a fixing center shaft 14a in the center of the sensor portion 100 and a plurality of weight portions 12*a* at the circumference of the fixing center shaft 14*a*.

As the surround mass method, an inertial sensor to which the present invention has been applied can be obtained. Signals detected by the piezoresistor 11 formed on the beam 13 are guided to the bottom of the center shaft 14*a* via a through electrode 17*d* that is formed in the center shaft 14*a*.

Furthermore, detected signals are outputted to the outside by means of a through electrode 17*a* and a pad electrode 17*c* of the substrate 16 that are electrically connected to a pad 17*b* that is formed on the lower substrate 16 by means of a bump 17.

In FIG. 9, the lower substrate 16 becomes the first weight stopper portion for the weight portion 12*a* and the upper substrate 15 functions as the second weight stopper portion. An inertial sensor, which achieves the effects of the present invention, is obtained as a result of the sensor portion 100 being sealed with the first and second weight stopper portions.

The present invention makes it possible to provide an inertial sensor such as an acceleration sensor or gyro with superior impact resistance that regulates the displacement of the weight portion 12 in the direction of the upper limit by means of a simple structure.

What is claimed is:

1. An inertial sensor, comprising:
   a sensor portion that has a fixing part, a weight portion the height of which is a predetermined size shorter than that of the fixing part, and a beam portion that links the weight portion and the fixing part;
   a plate-like first stopper portion that covers the weight portion and is bonded to the fixing part with clearance of a predetermined size from the weight portion; and
   a flat, plate-like second stopper portion that is connected to the fixing part on the side opposite to the first stopper portion via a bump, which provides at least clearance of a predetermined height between the second stopper portion and the weight portion.

2. The inertial sensor according to claim 1, wherein the height of the predetermined size and the predetermined height of the bump are established at or exceeding the range of displacement of the weight portion corresponding to the dynamic range.

3. The inertial sensor according to claim 1, wherein the fixing part of the sensor portion is a frame portion, the weight portion is disposed within the frame portion, and the frame portion, the weight portion, and the beam portion linking the weight portion and the frame portion are integrally formed.

4. The inertial sensor according to claim 1, wherein the fixing part of the sensor portion is a center shaft, the weight portion is disposed at the circumference of the center shaft, and the center shaft, the weight portion, and the beam portion linking the weight portion and center shaft are integrally formed.

5. The inertial sensor according to claim 3 or 4, wherein the integrally formed fixing part, weight portion, and beam portion of the sensor portion are formed from a silicon substrate by means of MEMS processing.

6. The inertial sensor according to claim 1, wherein the sensor portion comprises a piezoresistive element in the parts of the beam portion in which the beam portion is connected to the fixing part and the weight portion, and the inertia in multiaxial directions is detected from the change in the resistance resulting from displacement of the weight portion.

* * * * *